(12) United States Patent
Ruscitto et al.

(10) Patent No.: US 6,292,922 B1
(45) Date of Patent: Sep. 18, 2001

(54) SOURCE CONTROLLED CHANNEL DECODING USING AN INTRA-FRAME

(75) Inventors: Alfredo Ruscitto, Nice (FR); Thomas Hindelang, München; Wen Xu, Unterhaching, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/460,345

(22) Filed: Dec. 13, 1999

Related U.S. Application Data

(63) Continuation of application No. PCT/DE98/01579, filed on Jun. 10, 1998.

(30) Foreign Application Priority Data

Jun. 13, 1997 (DE) .............................. 197 25 131

(51) Int. Cl.$^7$ .................................................. H03M 13/01
(52) U.S. Cl. .......................................................... 714/795
(58) Field of Search ............................. 714/795; 375/262

(56) References Cited

U.S. PATENT DOCUMENTS 5,511,081 * 4/1996 Hagenauer ........................... 714/795

FOREIGN PATENT DOCUMENTS

| 42 24 214 C2 | 1/1994 | (DE) . |
| 0 727 890 A2 | 8/1996 | (EP) . |
| 0 800 280 A1 | 10/1997 | (EP) . |
| 2 305 827 A | 4/1997 | (GB) . |

OTHER PUBLICATIONS

Ruf et al., Source–Controlled Channel Decoding in Image Transmission, IEEE, p. 14–19, Sep. 1996.*
Xu et al., Joint Source–Channel Decoding Using the Residual Redundancy in Compressed Images, IEEE, p. 142–148, 1996.*
"Channel–Decoding with Apriori–knowledge in non–binary source symbols" (Hindelang et al.), ITG Technical Report, No. 164, Mar. 1998, chapters 2 and 4.
"Channel–Decoding Using Residual Intra–Frame Correlation in a GSM System" (Ruscitto et al.), 8030 Electronics Letters, vol. 33, No. 21, Oct. 1997.
"High–Speed VLSI Architectures fort Soft–Output Viterbi Decoding" (Jerossen et al.), 8367 Journal of VLSI Signal Processing, No. 2, Oct. 1994, pp. 169–179.
"Source–Controlled Channel Decoding" (Hagenauer), 8089 IEEE Transactions on Communications, No. 9, Sep. 1995, pp. 2449–2457.

* cited by examiner

Primary Examiner—Albert DeCady
Assistant Examiner—Shelly A Chase
(74) Attorney, Agent, or Firm—Herbert L. Lerner; Laurence A. Greenberg; Werner H. Stemer

(57) ABSTRACT

A method for a source-controlled channel-decoding of data in a frame format includes the steps of channel-decoding a given frame of data, determining an a-posteriori information based on a reliability decision of the channel-decoding and/or a source-decoding subsequent to the channel-decoding, calculating an a-priori information based on the a-posteriori information and based on a residual redundancy of the data, and channel-decoding the given frame once more using the a-priori information. The method thus uses the residual correlation between bits in a frame. The method preferably uses the intra-frame correlation in a GSM system. A channel-decoder configuration is also provided.

21 Claims, 2 Drawing Sheets

SOURCE CONTROLLED CHANNEL DECODING USING AN INTRA-FRAME

CROSS-REFERENCE TO RELATED APPLICATION

This application is a continuation of copending International Application PCT/DE98/01579, filed Jun. 10, 1998, which designated the United States.

BACKGROUND OF THE INVENTION

FIELD OF THE INVENTION

The present invention relates to a method and a decoder for a source-controlled channel-decoding of data in a frame format.

Source signals such as voice, sound, image and television almost always include statistical redundancy in the sense of a correlation between different bits. This redundancy can be greatly reduced through the use of source-encoding so that an efficient transmission or storage of the source signal is made possible. This reduction in redundancy eliminates redundant signal contents prior to a transmission. The redundant signal contents are based on the previous knowledge of, for example, statistical parameters of the signal profile. After the transmission, these parts or portions are added again to the signal so that it is objectively impossible to demonstrate any loss of quality. Due to the incomplete knowledge of the source signals or restrictions in the complexity of the encoding method, the source-encoding can usually only be implemented in a less than optimum way, i.e. there is still a certain degree of redundancy in the compressed data even after the encoding.

On the other hand, when transmitting the signals it is necessary to selectively add redundancy again through the use of a channel-encoding in order to largely eliminate the effects of a channel interference on the transmission. Additional redundant bits thus make it possible for the receiver to detect errors, and possibly also correct them, without involving the transmitter.

For a long time, one of the basic premises of the information theory was that source-encoding and channel-encoding could be carried out independently of one another in order to achieve an optimum result. According to this principle, the configuration of the source-decoder depends only on the source properties, whereas the channel-encoding scheme will depend only on the channel properties. This principle may be correct if the source-encoder supplies statistically independent results which are thus noncorrelated and equally probable and if the decoding delay can be of any desired value. In practical applications, these conditions are however usually not fulfilled. The output signal of the source-encoder often has a residual redundancy, and at the same time the permitted delay is restricted, in particular in the case of voice transmission.

This residual redundancy of the source-encoded data may be used in the so-called source-controlled channel-decoding, in order to correct further bit errors. In this case, the decoding operation of the channel-decoder is controlled on the one hand by the transmitted code bits and on the other hand by an item of a-priori/a-posteriori information relating to the most probable value of a number of important source bits. The source information therefore affects the way in which the channel-decoding proceeds. In the case of Viterbi algorithm decoding, this process is referred to as an a-priori Viterbi algorithm. When such a method is used, a modification is necessary only at the receiver end.

The German Patent DE 42 24 214 and the publication "Source-Controlled Channel Decoding", J. Hagenauer, IEEE Trans. Commun., vol. 43, pages 2449–2457, September 1995 disclose the use of the inter-frame correlation, i.e. the statistical dependence between chronologically and/or spatially adjacent signal samples in source-controlled channel-decoding.

The above-mentioned method will now be explained in more detail with reference to FIG. 4. As is clear in FIG. 4, according to this method, a signal is firstly source-encoded 10, then channel-encoded, transmitted over a transmission channel 12, channel-decoded 13 and finally source-decoded 14. Furthermore, the channel-decoding takes place under source control using an item of a-priori information and an item of a-posteriori information relating to the sources.

Here, a reliability, which determines in advance (a-priori) a probability for a decision in a subsequent step, is calculated subsequently (a-posteriori) from the statistic of the source and the information which has already been decided. Here, the a-posteriori information can be acquired directly downstream of the channel-decoder, but may also be acquired downstream of the source-decoder.

Parametric encoding methods are treated below. Here, the bit stream which is generated by the source (e.g. voice) is divided into blocks (e.g. chronological frames) and these are processed separately. The source-encoding supplies so-called parameters (e.g. voice coefficients) which reflect the properties of the source in the current block in a certain way (e.g. voice spectrum, filter parameters) and which are quantized with a certain number of bits.

Here, in particular a correlation of the source bits is taken into account. The fundamental idea of this method is that the most significant bits of a parameter do not change very often between two successive frames and there is thus redundancy in the transmission. This correlation between successive frames can be exploited at the receiver end by using an APRI-SOVA (a-priori soft decision Viterbi algorithm) decoder. In a soft-decision decoder, not only the actual decision but also the reliability of the decision is taken into account. In summary, according to this method, a source-controlled channel-decoding takes place using the inter-frame correlation.

However, it has become apparent that due to the unequal distribution of the parameter values, which is in turn due to the nonstationarity of the source signals, in particular when transmitting voice, there may be residual redundancy not only between bits in successive frames (inter-frame correlation) but also between the bits of a parameter within one frame. This redundancy between different bits of a frame is referred to as intra-frame redundancy. In other words an intra-frame correlation exists between bits belonging to the same frame.

SUMMARY OF THE INVENTION

It is accordingly an object of the invention to provide a method for a source-controlled channel-decoding of data in a frame format and a channel-decoder configuration for data in a frame format which overcome the above-mentioned disadvantages of the heretofore-known methods and devices of this general type and which perform an effective decoding with little expenditure.

With the foregoing and other objects in view there is provided, in accordance with the invention, a method for a source-controlled channel-decoding of data in a frame format, preferably in a GSM frame format, including the steps of channel-decoding a given frame of data, such as data of a voice channel according to the GSM standard; determining an a-posteriori information based on at least one of a reliability decision of the channel-decoding and a source-decoding subsequent to the channel-decoding; calculating an a-priori information based on the a-posteriori information and based on a residual redundancy of the data; and channel-decoding the given frame once more using the a-priori information.

In accordance with another mode of the invention, during an encoding of the data of the given frame, respective items of the data of the given frame are provided with different error protections depending on how important or a significant the respective items of the data are for a successful transmission.

In accordance with yet another mode of the invention, the a-priori information is determined by logically linking the a-posteriori information with source properties. The source properties may be determined by taking into account the last frames. The number of frames being taken into account may be based on at least one source property, such as a correlation and a sationarity.

In accordance with a further mode of the invention, in particular when the invention is used in a GSM system, the last 128 frames or the last 256 frames are taken into account when determining the source properties.

With the objects of the invention in view there is also provided, a channel-decoder configuration, including a channel-decoder decoding a given frame having data, the channel-decoder determining an a-posteriori information relating to the data of the given frame by using a reliability decision; and a calculation unit connected to the channel-decoder, the calculation unit determining an a-priori information based on the a-posteriori information and supplying the a-priori information to the channel-decoder, the channel-decoder decoding the given frame once more using the a-priori information.

In accordance with another feature of the invention, a source-decoder is connected to the channel-decoder, the channel-decoder supplies information for determining the a-posteriori information to the source-decoder, the calculation unit receives the a-posteriori information from the channel-decoder and/or the source-decoder.

In accordance with yet another feature of the invention, the calculation unit determines the a-priori information from a logic linking of the a-posteriori information with source properties. The calculation unit may determine the source properties by taking into account a given number of preceding frames.

In accordance with an added feature of the invention, an encoder is connected to the channel-decoder, the encoder provides respective items of the data of the given frame with different error protections depending on a significance or importance of the respective items of the data for a successful transmission.

With the objects of the invention in view there is further provided, a channel-decoder configuration, including a channel-decoder decoding a given frame having data; a source-decoder connected to the channel-decoder, the source-decoder receiving information for determining an a-posteriori information from the channel-decoder; and a calculation unit connected to the source-decoder, the calculation unit determining an a-priori information based on the a-posteriori information and supplying the a-priori information to the channel-decoder, the channel-decoder decoding the given frame once more using the a-priori information.

The central idea of the invention here is to utilize the intra-frame correlation in the channel-decoding in order to increase the fault immunity or interference immunity and to improve the error correction.

The invention therefore provides a method for the source-controlled channel-decoding of data in a frame format. Firstly, a frame channel is decoded. This channel-decoded frame can then be source-decoded in order to determine an item of a-posteriori correlation information relating to the data of the channel-decoded frame. In addition, as an alternative, it is also possible to calculate directly an item of information, referred to below as a-priori information, from the decided information of the channel-decoder and its reliability. In a second channel-decoding step, the same frame as before is then channel-decoded once more, but this time using the calculated a-priori information based on the correlation and the residual redundancy.

For the channel-decoding, in particular a soft decision Viterbi algorithm and an a-posteriori maximum probability algorithm can be used. A soft decision algorithm in this context is an algorithm which not only outputs a decision value but also indicates the probability with which the decided value is present.

The above-mentioned method can be applied in particular to the decoding of the voice channel of the GSM (Global System for Mobile Communications) standard. According to the invention, a channel-decoder is furthermore provided for encoded data in a frame format. Here, a channel-decoder is provided which, according to one exemplary embodiment, firstly decodes a frame without a-priori information. However, it is also possible that, even during this first decoding, the channel-decoder can make use of an item of a-priori information which is supplied to it. The a-posteriori information can alternatively be determined through the use of a source-decoder or directly by the channel-decoder.

A calculation unit determines, on the basis of the a-posteriori information and possibly an item of source information/a source-statistic, an item of a-priori information which is fed to the channel-decoder. The channel-decoder then decodes once more the same frame as before using the a-priori information from the calculation unit.

Any desired algorithm can be used for the channel-decoder. However, it is particularly advantageous to use an algorithm which outputs not only the actual decision but also an item of reliability information, as is the case for example in a soft-decision Viterbi decoder or an a-posteriori maximum probability decoder.

According to the invention, a channel-encoder/decoder unit which has a decoder of the above-mentioned type is also provided. Furthermore, this channel-encoder/decoder unit may have an encoder which provides the data of a frame with a different error protection (unequal error protection scheme) depending on their significance for a successful transmission.

Other features which are considered as characteristic for the invention are set forth in the appended claims.

Although the invention is illustrated and described herein as embodied in a source-controlled channel-decoding using the intra-frame correlation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
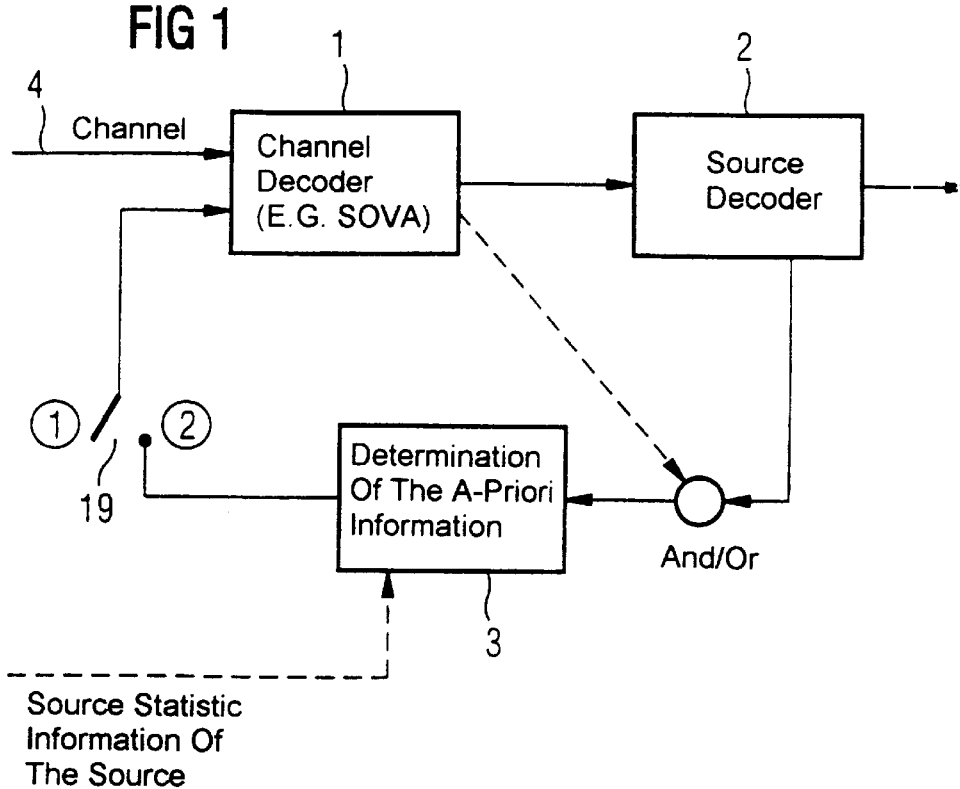
FIG. 1 is a block diagram illustrating the structure of a source-controlled channel-decoder according to the invention.

Referring now to the figures of the drawings in detail and first, particularly, to FIG. 1 thereof, there is shown a basic structure of a source-controlled channel-decoder according to the invention. As has already been stated above, according to the invention, the residual redundance between bits of a parameter is evaluated within one frame in order to perform source-controlled channel-decoding. In order to determine this intra-frame correlation of the bits, the invention proposes a method based on a repeated channel-decoding. As illustrated in FIG. 1, encoded data are fed on a transmission channel 4 to a channel-decoder 1 in a frame format, for example the GSM standard. This channel-decoder 1 may be, for example, a so-called SOVA (soft decision Viterbi algorithm) or a MAP (a-posteriori maximum probability) decoder. In these decoders, the received signal is compared with all the basically possible signals and the signal which is most similar to the received signal is then selected. According to this example, the encoded data which are supplied on the transmission channel 4 are therefore decoded by this channel-decoder 1 without using an item of a-priori information. However, even during this first decoding, the channel-decoder can make use of an item of a-priori information which is fed to the channel-decoder.

Reference numeral 19 in FIG. 1 represents a symbolic switch which is set to the position ① in the first decoding step of the channel-decoder 1. After this first channel-decoding step by the channel-decoder without using a-priori correlation information, this decoded signal can be fed to a source-decoder. The source-decoder carries out a source-decoding of the data supplied from the channel-decoder 1 in order to acquire or extract an item of a-posteriori information. Alternatively or additionally, the a-posteriori information can also be extracted directly downstream of the channel-decoder 1, as is represented by a broken line in FIG. 1. This a-posteriori information is transmitted to a unit 3 which calculates an item of a-priori information on the basis of the a-posteriori information, as is described below in detail. This a-priori information from the unit 3 is then fed to the channel-decoder 1. The symbolic switch 19 is, as it were, at the position ②. The channel-decoder 1 then carries out a channel-decoding with the same frame as before, but this time taking into account the a-priori information from the unit 3. Thus, during the second channel-decoding, a source-controlled channel-decoding is carried out.

In summary, it is therefore the case that in the first step for decoding a frame, preferably a decoding without taking into account the a-priori information is used. Using the decoded parameters, and item of a-posteriori information, i.e. an intra-frame correlation, can then be determined for the decoded bit. In the second step, the received frame is then decoded once more, the a-priori information acquired during the previous decoding being used this time.

This method can be used in principle in all channel-decoding operations provided the source bits (voice, image, data, etc.) have an intra-frame correlation, as is the case, for example, in the decoding of the control information for the GSM control channel (e.g. SACCH). In particular in the case of the GSM full rate voice encoding or in the case of the enhanced full-rate voice encoding, this method can achieve a further improvement in efficiency over source-controlled channel-decoding based on the intra-frame correlation of the bits.

Figure 3:
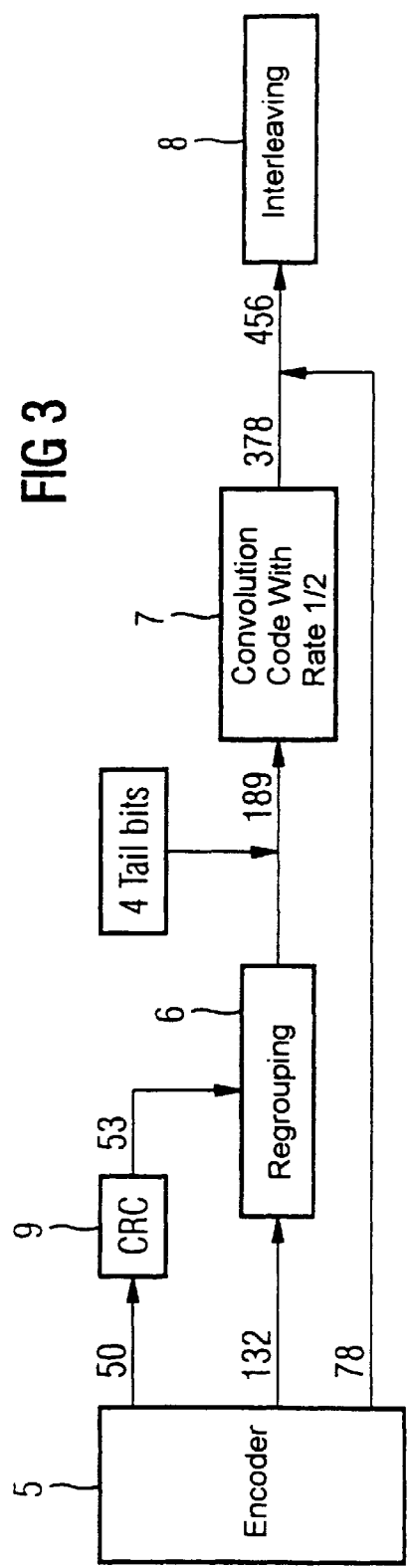
FIG. 3 a block diagram of a channel-decoder which can be used in accordance with an exemplary embodiment of the invention, together with the decoder of FIG. 1, as and encoder/decoder (Codec) unit.
Figure 4:
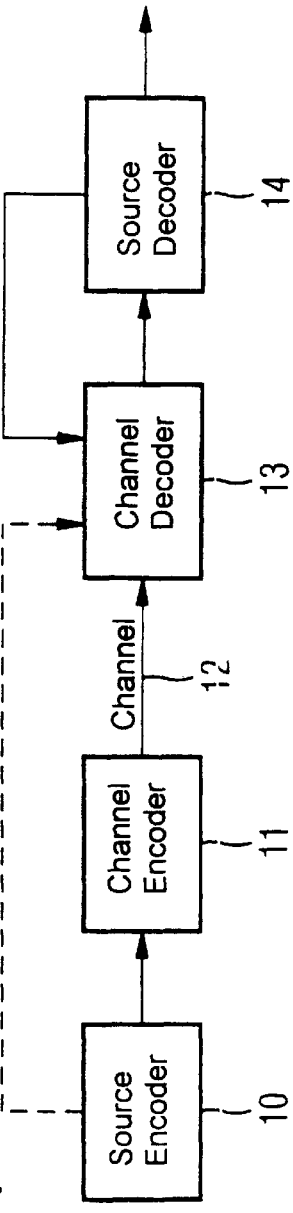
FIG. 4 is a block diagram illustrating the structure of an encoder/decoder unit according to the prior art.

An encoder such as is used in accordance with the invention is described below with reference to FIG. 3. In a GSM full-rate transmission of voice information, the sensitivity of the source-decoder with respect to channel faults is typically not uniform. The quality of the reconstructed voice information is fairly immune to degradation by errors in certain types of bits, whereas the quality of the voice declines severely if faults in a different class of bits occur. The voice encoder 5 generates a frame with 260 bits every 20 milliseconds. Each frame can be divided into three bit classes with a different significance and sensitivity. The channel encoding processes are developed in such a way that the smallest bit error probability occurs in the most important class. According to the channel-encoding scheme of FIG. 3, the 50 most important bits (class 1a) are firstly protected by three bits of a cyclical block protection method, as is indicated by the CRC unit 9 in FIG. 3. The next 132 important bits (class 1b) are regrouped with the above-mentioned 53 bits, as is illustrated by the regrouping unit 6 in FIG. 3, and are convolution-encoded together with four tail bits at a rate of ½, as is illustrated by the convolution unit 7 in FIG. 3. The 78 less important bits (class 2) are transmitted uncoded. Finally, an inteleaving may be performed, as is illustrated by the interleaving unit 8.

Figure 2:
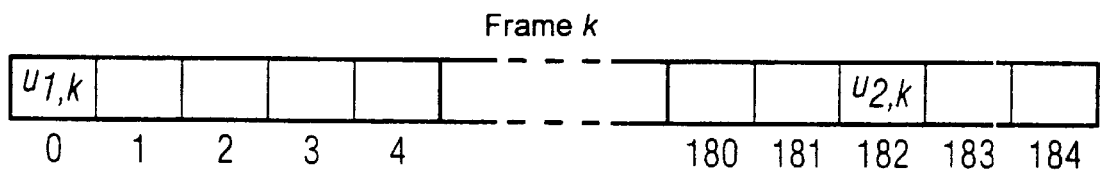
FIG. 2 is a diagram of a frame with bits having a given correlation.

The way in which the intra-frame correlation is determined will now be explained in more detail with reference to FIG. 2. As stated above, each coefficient which is output by the voice encoder 6 in FIG. 3 is quantized with a different number of bits depending on its importance or significance. In FIG. 2, $u_{1,k}$ and $u_{2,k}$ designate the two most important bits of a certain coefficient at the time k. Due to the residual redundancy at the output of the source-encoder, the bits $u_{1,k}$ and $u_{2,k}$ are not statistically independent within the same frame. This means that there is a correlation between these bits $u_{1,k}$ and $u_{2,k}$. The residual correlation within the same frame can be expressed as follows:

$$u_{1,k} = f(u_{2,k}) \qquad \text{Equation 1}$$

$$u_{2,k} = f(u_{1,k}) \qquad \text{Equation 2}$$

with the result that the a-priori probabilities relating to $u_{1,k}$ and $u_{2,k}$ can be expressed as follows:

Equation 3:

$$P(u_{1,k} = i) = \sum_{j \in \{-1,+1\}} P(u_{1,k} = i \mid u_{2,k} = j) \cdot P(u_{2,k} = j)$$

Equation 4:

$$P(u_{2,k} = i) = \sum_{j \in \{-1,+1\}} P(u_{2,k} = i \mid u_{1,k} = j) \cdot P(u_{1,k} = j)$$

(where i, j$\in\{-1;+1\}$)

In this case, as defined in equations 3 and 4, the a-priori information ($P(u_{1,k}{=}i)$, $P(u_{2,k}{=}i)$) can be obtained as a combination of the a-posteriori information ($P(u_{2,k}{=}j)$, $P(u_{1,k}{=}j)$) and the source properties ($P(u_{1,k}{=}i|u_{2,k}{=}j)$, $P(u_{2,k}{=}i|u_{1,k}{=}j)$). Meanwhile, it should be noted that with inter-frame correlation the a-posteriori probabilities are available at the receiver end since the a-posteriori information is used to draw conclusions relating to the bit $u_{q,k+1}{=}f(u_{q,k})$ only in the next frame. As is clear from FIG. 2, the a-posteriori information $P(u_{2,k}{=}j)$ is, however, not yet available in the case of the use of the intra-frame redundancy according to the invention at the point when the decoder is processing the information bit $u_{1,k}$. In order to avoid this problem, the decoder algorithm mentioned above is used:

Step 1:

The entire received frame is processed by a decoder, preferably without a-priori information. However, even during this first step, the decoder can make use of an item of a-priori information which is fed to it. The a-posteriori probabilities of the correlated bits are used to calculate the new a-priori information according to equations 3 and 4.

Step 2:

The received frame is decoded once more, an APRI-SOVA decoder being used this time to evaluate the a-priori information which has been calculated in the previous step.

The probabilities $P(u_{1,k}{=}i|u_{2,k}{=}j)$ and $P(u_{2,k}{=}i|u_{1,k}{=}j)$, which describe the source properties, can easily be estimated at the receiver end in the following way. The symbol $S_k \in (0, 1, 2, 3)$ is assigned to the pair $(u_{1,k}, u_{2,k})$ according to the following binary formation:

Equation 5:

$(-1, -1) \leftrightarrow 0$ $(-1, +1) \leftrightarrow 1$ $(+1, -1) \leftrightarrow 2$ $(+1, +1) \leftrightarrow 3$ Assuming that the decisions arrived at from the last 1 frame (1 designates a value of a window and can be, for example, 128 or 256 for the GSM full rate) have been used to estimate the probabilities P(0), P(1), P(2) and P(3) of the symbols $S_k$ which have been obtained previously, the source properties can be calculated. The probability of the occurrence of a symbol is therefore estimated as a function of the last 1 frames. The value 1 is selected here as a function of the properties of the source, such as correlation or stationarity.

Equation 6:

$$P(u_{1,k} = -1 \mid u_{2,k} = -1) = \frac{P(0)}{P(0) + P(2)}$$

$$P(u_{1,k} = +1 \mid u_{2,k} = -1) = \frac{P(2)}{P(0) + P(2)}$$

$$P(u_{1,k} = -1 \mid u_{2,k} = +1) = \frac{P(1)}{P(1) + P(3)}$$

-continued $$P(u_{1,k} = +1 \mid u_{2,k} = +1) = \frac{P(3)}{P(1) + P(3)}$$

$$P(u_{2,k} = -1 \mid u_{1,k} = -1) = \frac{P(0)}{P(0) + P(1)}$$

$$P(u_{2,k} = +1 \mid u_{1,k} = -1) = \frac{P(1)}{P(0) + P(1)}$$

$$P(u_{2,k} = -1 \mid u_{1,k} = +1) = \frac{P(2)}{P(2) + P(3)}$$

$$P(u_{2,k} = +1 \mid u_{1,k} = +1) = \frac{P(3)}{P(2) + P(3)}$$

It is quite apparent that if the symbols $S_k$ are not distributed with a uniform probability, the bits $u_{1,k}$ and $u_{2,k}$ are not statistically independent and there is thus a correlation.

This statistical dependence between bits within the same frame is, as stated above, used to improve the efficiency of the decoder.

Since voice information constitutes a highly nonstationary process, the source properties may change greatly during a certain period of time. The object of the shift window is therefore to estimate the probabilities of the symbols $S_k$ for the current voice segment.

We claim:

1. A method for a source-controlled channel-decoding of data in a frame format, the method which comprises:

channel-decoding a given frame of data;

determining an a-posteriori information based on at least one of a reliability decision of the channel-decoding and a source-decoding subsequent to the channel-decoding;

calculating an a-priori information based on the a-posteriori information and based on a residual redundancy of the data; and channel-decoding the given frame once more using the a-priori information.

2. The method according to claim 1, which comprises providing, during an encoding of the data of the given frame, respective data of the given frame with different error protections depending on a significance of the respective data for a successful transmission.

3. The method according to claim 1, which comprises determining the a-priori information from a logic linking of the a-posteriori information with source properties.

4. The method according to claim 3, which comprises determining the source properties by taking into account a given number of preceding frames.

5. The method according to claim 4, which comprises selecting the given number based on at least one source property selected from a group consisting of a correlation and a sationarity.

6. A method for a source-controlled channel-decoding of data in a GSM frame format, the method which comprises:

channel-decoding a given frame of data of a voice channel according to the GSM standard;

determining an a-posteriori information based on at least one of a reliability decision of the channel-decoding and a source-decoding subsequent to the channel-decoding;

calculating an a-priori information based on the a-posteriori information and based on a residual redundancy of the data; and channel-decoding the given frame once more using the a-priori information.

7. The method according to claim 6, which comprises providing, during an encoding of the data of the given frame, respective data of the given frame with different error protections depending on a significance of the respective data for a successful transmission.

8. The method according to claim 6, which comprises determining the a-priori information from a logic linking of the a-posteriori information with source properties.

9. The method according to claim 8, which comprises determining the source properties by taking into account a given number of preceding frames.

10. The method according to claim 8, which comprises determining the source properties by taking into account the last 128 frames.

11. The method according to claim 8, which comprises determining the source properties by taking into account the last 256 frames.

12. The method according to claim 9, which comprises selecting the given number based on at least one source property selected from a group consisting of a correlation and a sationarity.

13. A channel-decoder configuration, comprising:
a channel-decoder decoding a given frame having data, said channel-decoder determining an a-posteriori information relating to the data of the given frame by using a reliability decision; and
a calculation unit connected to said channel-decoder, said calculation unit determining an a-priori information based on the a-posteriori information and supplying the a-priori information to said channel-decoder, said channel-decoder decoding the given frame once more using the a-priori information.

14. The channel-decoder configuration according to claim 13, including a source-decoder connected to said channel-decoder, said channel-decoder supplying information for determining the a-posteriori information to said source-decoder, said calculation unit receiving the a-posteriori information from at least one of said channel-decoder and said source-decoder.

15. The channel-decoder configuration according to claim 13, wherein said calculation unit determines the a-priori information from a logic linking of the a-posteriori information with source properties.

16. The channel-decoder configuration according to claim 15, wherein said calculation unit determines the source properties by taking into account a given number of preceding frames.

17. The channel-decoder configuration according to claim 13, including an encoder connected to said channel-decoder, said encoder providing respective data of the given frame with different error protections depending on a significance of the respective data for a successful transmission.

18. A channel-decoder configuration, comprising:
a channel-decoder decoding a given frame having data;
a source-decoder connected to said channel-decoder, said source-decoder receiving information from said channel-decoder for determining an a-posteriori information; and
a calculation unit connected to said source-decoder, said calculation unit determining an a-priori information based on the a-posteriori information and supplying the a-priori information to said channel-decoder, said channel-decoder decoding the given frame once more using the a-priori information.

19. The channel-decoder configuration according to claim 18, wherein said calculation unit determines the a-priori information from a logic linking of the a-posteriori information with source properties.

20. The channel-decoder configuration according to claim 19, wherein said calculation unit determines the source properties by taking into account a given number of preceding frames.

21. The channel-decoder configuration according to claim 18, including an encoder connected to said channel-decoder, said encoder providing respective data of the given frame with different error protections depending on a significance of the respective data for a successful transmission.

* * * * *